United States Patent [19]

Parker

[11] 3,941,531
[45] Mar. 2, 1976

[54] APPARATUS FOR APPLYING FOAM COATING TO PREFORMED PIPE

[75] Inventor: William D. Parker, Tulsa, Okla.

[73] Assignee: Joyce Western Corporation, Andover, N.Y.

[22] Filed: Jan. 30, 1974

[21] Appl. No.: 437,766

[52] U.S. Cl. .......... 425/96; 118/DIG. 11; 264/46.9; 425/113; 425/817 C
[51] Int. Cl.² ........................................... B29F 3/10
[58] Field of Search .......... 425/4 C, 817 C, 90, 101, 425/104, 113, 97, 107, 110, 114, 96; 156/78, 79, 392; 264/46.5, 46.9, 262, 47; 118/DIG. 11, DIG. 13; 427/409, 411

[56] References Cited
UNITED STATES PATENTS

| | | | |
|---|---|---|---|
| 2,579,815 | 12/1951 | Gialanella | 425/97 |
| 2,581,769 | 1/1952 | Olson | 425/104 X |
| 3,366,719 | 1/1968 | Lueders | 425/4 C X |
| 3,432,582 | 3/1969 | Bender | 425/817 C X |
| 3,709,751 | 1/1973 | Carlson et al. | 156/78 |
| 3,797,981 | 3/1974 | Van Dijk | 425/110 |
| 3,840,384 | 10/1974 | Reade et al. | 118/DIG. 11 |

Primary Examiner—Robert D. Baldwin
Assistant Examiner—Mark Rosenbaum
Attorney, Agent, or Firm—Laurence, Stokes & Neilan

[57] ABSTRACT

A foamable synthetic plastic composition such as a polyurethane is foamed in place around a pipe within a tubular former disposed concentrically about the pipe while the former moves longitudinally along the pipe. Conditions are regulated to form an external skin on the foam. A hot melt glue or similar composition is applied as an outer sealer onto the foam within the tubular former. Preferably a spiral wrapping of polyethylene film or the like is applied while the sealer is still hot and adhesive, and an aluminum jacket may be applied on top of the spiral wrapping.

10 Claims, 3 Drawing Figures

APPARATUS FOR APPLYING FOAM COATING TO PREFORMED PIPE

BACKGROUND OF THE INVENTION

The present invention relates to applying coatings to the exterior of pipe, and more particularly to a method of foaming a synthetic plastic in place about a preformed pipe employing a tubular former which is disposed concentrically about the pipe.

It is known to apply coatings to pipes to increase the useful life of the pipes by protecting the pipes from environmental factors, and it is also known to utilize coatings to insulate pipes.

However, there are many problems associated with obtaining relatively uniform, weather resistant coatings on pipes, particularly on large diameter pipes intended to be employed in oil pipelines and similar applications. The application of exterior foam coatings to relatively large pipes is a particular problem when the pipe has been preformed and when it is necessary for the foam coating to withstand the rigorous operating conditions encountered in pipeline usages.

SUMMARY OF THE INVENTION

According to a presently preferred embodiment of the invention, a tubular former or sleeve mounted upon a wheeled carriage or other transporting device is positioned concentrically about the pipe to be coated. A foamable composition is pumped to discharge outlets within the sleeve. Preferably the foamable composition is a foam-forming polyurethane composition which expands when leaving the discharge conduits to fill the annular gap between the pipe and the sleeve. A water proofing sealant such as a hot melt glue is distributed around the inner periphery of the sleeve in order to apply a waterproof coating to the exterior surface of the foam while within the sleeve. In a presently preferred embodiment of the invention, a pool of sealant is maintained behind an annular flexible coating orifice lip so that a thin film of sealant is applied over the entire surface of the foam. A two component butyl rubber composition is also suitable for use as the sealant composition.

The sleeve is moved longitudinally along the pipe via the carriage which may engage the periphery of the pipe. In this fashion, the foam layer may be applied to a preformed pipe, for example, pipelines for in situ application of the foam. The tubular sleeve may have an inner polytetrafluoroethylene coating to inhibit sticking of the foam to the sleeve. Heating means may also be provided for the sleeve to facilitate application of the sealer.

A primary object of the present invention is to provide an improved method for efficiently and economically applying a foam jacket onto a preformed pipe. Another principal object of the invention is to provide novel apparatus capable of applying an insulating foam jacket to a preformed pipe. Another object of the invention is to obtain a pipe having a foam insulating jacket with a water barrier on the exterior of a foam insulation layer.

DETAILED DESCRIPTION OF THE INVENTION

Figure 1:
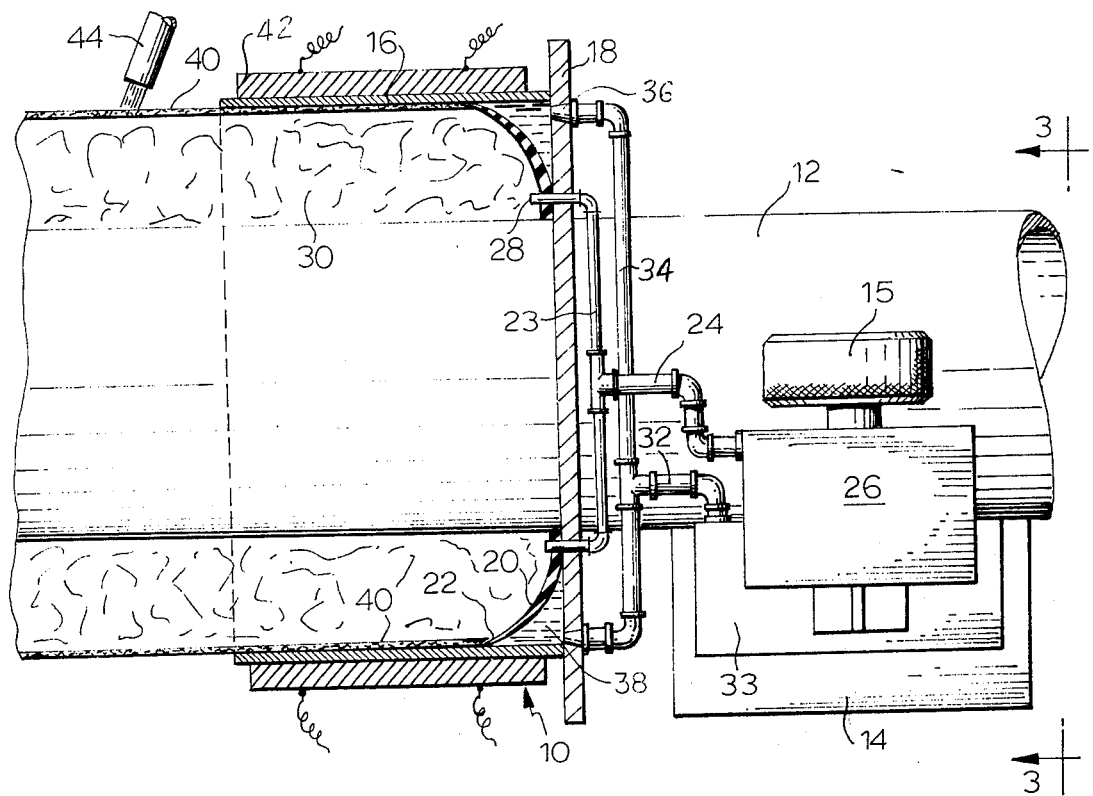
FIG. 1 is a plan view, partly in section, of a presently preferred embodiment of the invention.
Figure 3:
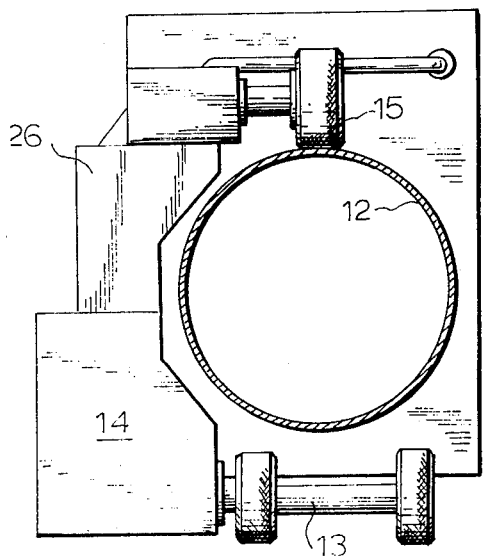
FIG. 3 is a view taken on the line 3—3 of FIG. 1.
Figure 2:
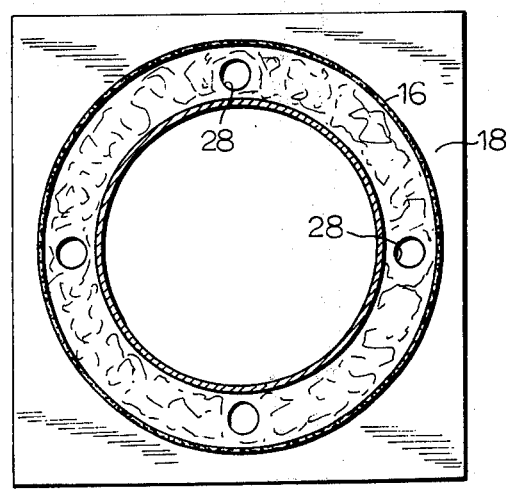
FIG. 2 is a left hand end view of the apparatus shown in FIG. 1 with the foam layer omitted.

Referring now to the drawings, reference numeral 10 generally designates apparatus for applying coatings to a preformed pipe 12. The apparatus comprises a wheeled carriage 13 having a suitable drive system 14 for traversing longitudinally along the pipe as the pipe is coated with an upper guide wheel 15 contacting the top of pipe 12. The coating apparatus includes a rigid, metal tubular former or sleeve 16 disposed concentrically about pipe 12 and connected to a vertical metal support plate 18. The support plate has a central opening of a size corresponding to the outside diameter of pipe 12 to enable the pipe to pass therethrough.

A flexible arcuate annular baffle or coating lip 20 has its inner surface sealed to support plate 18 adjacent the inner peripheral edge of the support plate. The lip 20 has a free edge 22 which is biased towards contact with the inside of sleeve 16.

Foam forming chemicals are supplied to a header 23 through an inlet conduit 24 from a supply tank 26. Header 23 supplies the foamable mixture to a plurality of discharge ducts 28 which communicate with the angular gap between the sleeve 16 and pipe 12. When the polyurethane or other foamable composition which has been under pressure is discharged from ducts 28 into the atmosphere; foam formation commences and the foam expands filling the gap between the pipe and the inner surface of sleeve 16. The inner surface of the sleeve 16 preferably has a coating to prevent the foam sticking to it, for example, a polytetrafluoroethylene coating. As a result an insulating layer or jacket 30 is produced around pipe 12.

A sealant composition is supplied from a supply tank 33 through inlet conduit 32, a header 34 and to discharge ducts 36 to form a pool of hot sealant in an annular region behind coating lip 20. The sealant accumulates forming a mass 38 which, when it fills the area behind lip 20, forces its way along the inner surface of sleeve 16 past the free edge 22 of the coating lip 20 to apply a continuous moisture proof barrier or coating 40 of the sealer to the newly expanded foam 30. The lip 20 is sufficiently resilient to be deflected away from the surface of sleeve 16 by the force of the flowing sealant so that a coating orifice is formed. The sealant may be a hot melt glue or wax, for example, a hot melt paraffin wax or a butyl rubber composition which is commercially available and is supplied in the form of two compounds which are mixed at the time of application.

It is presently preferred that the operating conditions be regulated to produce a thin external skin or non-foamed surface on the exterior of foam layer 30 as a protective measure to function in conjunction with the sealant layer 40. Production of a skin on a foamed body is a known expedient and the skin formation may be facilitated by heating sleeve 16 via a heating element 42. Any suitable heating element may be employed. Presently a resistance type heater comprised of a belt of silicone rubber containing resistance type heater wires embedded therein wrapped around the outer periphery of sleeve 16 has been found to be suitable. Heating the sleeve 16 also facilitates the application of the sealant layer 40 to the foam.

Polyurethane foams are well known in the art and such foams may have various physical properties depending upon the specific components, fillers and method of foaming. It is presently preferred that a flexible polyurethane foam be formulated in view of the good heat insulating properties as well as other desirable physical properties of such foams. Present day flexible polyurethane foams are generally based on polyoxypropylene diols or triols with the latter generally formed from glycerin, and are produced by reaction with a diisocyanate in the presence of catalysts and other additives.

The density of the foam may vary considerably. A density of about 2 pounds per cubic feet is presently preferred. The temperature of the foam forming composition at the time of application may vary depending, for example, upon the atmospheric temperature and the temperature of the pipe. For example, at a pipe temperature of about 80° F, the foam should initially be at about 145° F. Sleeve 16 may be heated to about 205°–225° F when the foam has a density of about 2 pounds per cubic foot. The sleeve may be heated to higher temperatures at higher foam densities. For a foam having a density of about 2 pounds per cubic foot, when the sleeve is heated above about 225° F, the foam starts to stick and there is a tendency for the skin on the foam to tear. Below about 205° F, the surface of the foam is rough and no skin is formed.

As diagrammatically illustrated in FIG. 1, conventional spiral wrapping apparatus 44 may be employed to spirally wrap a polyethylene film or similar material onto the layer of sealant 40 while the sealant is still hot. If desired, a metal, for example, an aluminum jacket (not shown) may be applied over the spirally wrapped film layer.

While presently preferred embodiments of the invention have been shown and described with particularly, it will be appreciated that various changes and modifications may suggest themselves to those of ordinary skill in the art upon being apprised of the present invention. It is intended to cover all such changes and modifications as fall within the scope and spirit of the appended claims.

I claim:

1. Apparatus for coating a preformed pipe, comprising a rigid tubular sleeve adapted to be positioned around a pipe with an annular gap between the pipe and the inner wall of said sleeve, support means for said sleeve, drive means connected to said support means for moving said sleeve longitudinally relative to said pipe, means separate from said drive means for supplying a foamable composition to fill the gap between the pipe and said sleeve as said sleeve moves along said pipe and means cooperating with the inner wall of said sleeve to apply a layer of a sealant to the external surface of foam produced from said foam forming composition while within said sleeve.

2. Apparatus according to claim 1, further comprising heating means to heat said sleeve.

3. Apparatus according to claim 1, wherein said means to supply said foam forming composition comprise a plurality of discharge ducts disposed within the gap between the pipe and said sleeve.

4. Apparatus according to claim 1, wherein said means for supplying said sealant comprise a flexible baffle having a free edge adjacent the inner surface of said sleeve which is deflectable to enable sealant to flow out between said free edge and said inner surface of said sleeve onto the external surface of said foam.

5. Apparatus according to claim 1, wherein said support means comprise a vertical plate attached to one end of said sleeve, said plate being provided with an opening for the pipe to pass therethrough.

6. Apparatus according to claim 5, wherein said drive means comprise a wheeled carriage disposed concentrically about the pipe.

7. Apparatus according to claim 1, wherein said sleeve has a diameter such that said gap has a width approximately corresponding to the thickness of the foam layer desired in the end product.

8. Apparatus according to claim 1, wherein said means for supplying a foamable composition comprises at least one discharge duct discharging into said gap.

9. Apparatus according to claim 8, wherein said discharge duct projects through a flexible baffle comprising said means to apply a layer of a sealant.

10. Apparatus according to claim 1, further comprising a non-stick coating provided on the inner surface of said sleeve, and means to supply sufficient sealant to form a distinct outer layer on the foam layer.

* * * * *